United States Patent
Michalski et al.

(10) Patent No.: US 7,401,829 B2
(45) Date of Patent: Jul. 22, 2008

(54) CRITICAL SEAM ALIGNMENT OF SOFT TRIM TO AUTOMOBILE COMPONENTS

(75) Inventors: Mark Michalski, Canton, MI (US); John Bizon, Farmington Hills, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 230 days.

(21) Appl. No.: 11/187,323

(22) Filed: Jul. 21, 2005

(65) Prior Publication Data

US 2007/0018472 A1      Jan. 25, 2007

(51) Int. Cl.
*B62D 39/00*   (2006.01)

(52) U.S. Cl. .................. 296/1.08; 29/91.1; 112/418; 112/419; 297/452.62

(58) Field of Classification Search .......... 296/1.08, 296/1.09, 24.34, 70, 63, 214, 146.7, 97.1; 428/43, 131, 61; 29/91.5, 91.1; 112/417, 112/418, 419; 297/452.6, 452.62
See application file for complete search history.

(56) References Cited

U.S. PATENT DOCUMENTS

| | | | | |
|---|---|---|---|---|
| 4,833,741 A | * | 5/1989 | Mizuno et al. ............... 5/404 |
| 5,017,413 A | * | 5/1991 | Moschini ..................... 428/61 |
| 5,148,588 A | * | 9/1992 | Prillard ........................ 29/91.1 |
| 5,290,093 A | * | 3/1994 | Crayne et al. ............ 297/452.61 |
| 5,635,264 A | | 6/1997 | Pike et al. |
| 5,669,129 A | * | 9/1997 | Smith et al. .................. 29/91.1 |
| 5,743,996 A | * | 4/1998 | Sakamoto et al. ............ 156/581 |
| 5,964,017 A | * | 10/1999 | Roberts ....................... 29/91.1 |
| 2004/0115391 A1 | * | 6/2004 | Dexheimer et al. .......... 428/99 |
| 2006/0113763 A1 | * | 6/2006 | Tracht et al. .............. 280/730.2 |
| 2006/0237986 A1 | * | 10/2006 | Brockschneider et al. ....................... 296/65.09 |

\* cited by examiner

*Primary Examiner*—Jason S Morrow
(74) *Attorney, Agent, or Firm*—Brooks Kushman P.C.

(57) ABSTRACT

An automobile interior component includes a substrate component having a seam-mating section. The seam-mating section has a welt protrusion-mating channel that is useful for accurately position a welt strip. The automobile interior component further includes a trim cover having at least one join seam. A welt strip having a welt protrusion section is attached to the trim cover. The welt strip allows positioning of the trim cover over the substrate in that the welt protrusion section is positioned in the welt protrusion-mating channel. A method for manufacturing the automobile interior component is also provided.

13 Claims, 4 Drawing Sheets

CRITICAL SEAM ALIGNMENT OF SOFT TRIM TO AUTOMOBILE COMPONENTS

BACKGROUND OF THE INVENTION

1. Field of the Invention

The present invention relates to automobile interior components in which soft trim cover material overlays a substrate component such that join and/or french seams in the soft trim cover material are aligned in a precise and stable manner.

2. Background Art

Many automobile interior components are of a construction in which a soft trim cover material layer overlays a substrate component. Modern fabrication of such components require increased tolerance control and stability for both initial and quality over time. Temporal instability may result from stresses induced in the soft trim cover material by the stretching and folding that is used to cover the substrate with the soft trim.

FIG. 1 provides an illustration of a prior art construction in which a substrate (usually at least partially foamed) is covered with soft trim layer. In FIG. 1, automobile interior component 10 includes trim cover 12 covering foam substrate 14. First trim pattern 16 is sewn to second trim pattern 18 along join seam 20. Typically, selvage section 22 is sewn to first trim pattern 16 along decorative seam 24. Similarly, selvage section 26 is sewn to second trim pattern 18 along decorative seam 28. Example of a decorative seam used in such applications is a French seam. In this prior art construction selvage sections 22, 26 along with join seam 20 are positioned over step section 30 with edge 32 of selvage section 22 aligned with edge 34 of foam substrate 14 and edge 36 of selvage section 26 aligned with edge 38 of foam substrate 14. In some variations only one edge is present for alignment. Although the prior art construction of FIG. 1 has worked reasonably well, tolerance control is problematic for some components. Loss of tolerance in the components results from variations in cutting trim patterns 16, 18, variations from sewing join seam 20 and decorative seams 24, 28, and variations in positioning trim cover 12 over the foam substrate 14.

U.S. Pat. No. 5,635,264 (the '264 patent) discloses another prior art construction in which a trim cover is placed over a foam substrate with somewhat improved tolerance control. FIG. 2 provides an illustration of the construction of the '264 patent. In this construction automobile interior component 50 includes trim cover 52 covering foam substrate 54. First trim pattern 56 is sewn to second trim pattern 58 along join seam 60 with positioning strip 62 interposes between first trim pattern 56 and second trim pattern 58. Again, selvage section 64 is sewn to first trim pattern 56 along decorative seam 66. Similarly, selvage section 68 is sewn to second trim pattern 58 along decorative seam 70. In this prior art construction selvage sections 64, 68 along with join seam 60 are positioned over step section 72 with edge 74 of selvage section 64 aligned with edge 76 of foam substrate 54 and edge 78 of selvage section 68 aligned with edge 80 of foam substrate 54. Improved positioning is achieved by placement of bottom section 82 of positioning strip 62 into positioning trench 84. Typically, this placement is accomplished by a person holding top section 86 during positioning or with automated placement. After placement, top section 86 of positioning strip 62 is torn away. Although the method of the '264 patent works well, the exposed sections of positioning strip 82 are sometimes undesirable. Moreover, the discarded top section 86 leads to undesirable material waste.

Accordingly, there exists a need for automobile interior components with improved positioning of a trim cover over a substrate.

SUMMARY OF THE INVENTION

The present invention solves one or more problems of the prior art by providing in at least one embodiment an automobile interior component in which a trim cover is positioned over a substrate with improved tolerance. The automobile interior component of this embodiment includes a substrate component having a seam-mating section. Significantly, the seam-mating section has a welt protrusion-mating channel that is useful for accurately position a welt strip. The automobile interior component further includes a trim cover having at least one join seam. A welt strip is attached to the trim component. The welt strip allows positioning of the trim component over the substrate in that the welt strip has a protrusion section adapted to be positioned in the welt protrusion-mating channel. The present embodiment may be used in the construction of any automobile interior component and in particular interior trim components.

In another embodiment of the invention, a method for making the automobile interior component of the invention is provided. The method of this embodiment includes the step of sewing first trim pattern and a second trim pattern together to form a trim cover having a join seam. A welt strip is then attached to the trim cover such that a welt protrusion section is adjacent to the join seam. The trim cover is then attached to a substrate component such that the welt protrusion section is positioned in the seam-mating section.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

Figure 1:
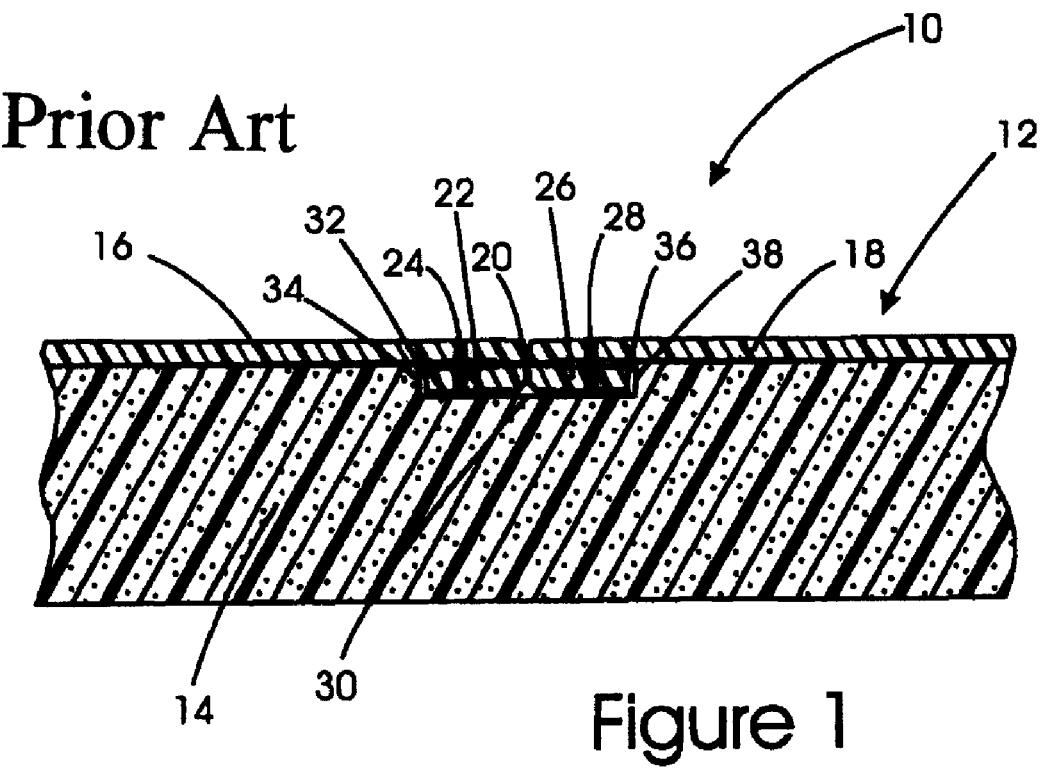
FIG. 1 is a cross-section of a prior art configuration in which a trim cover covers a substrate.
Figure 2:
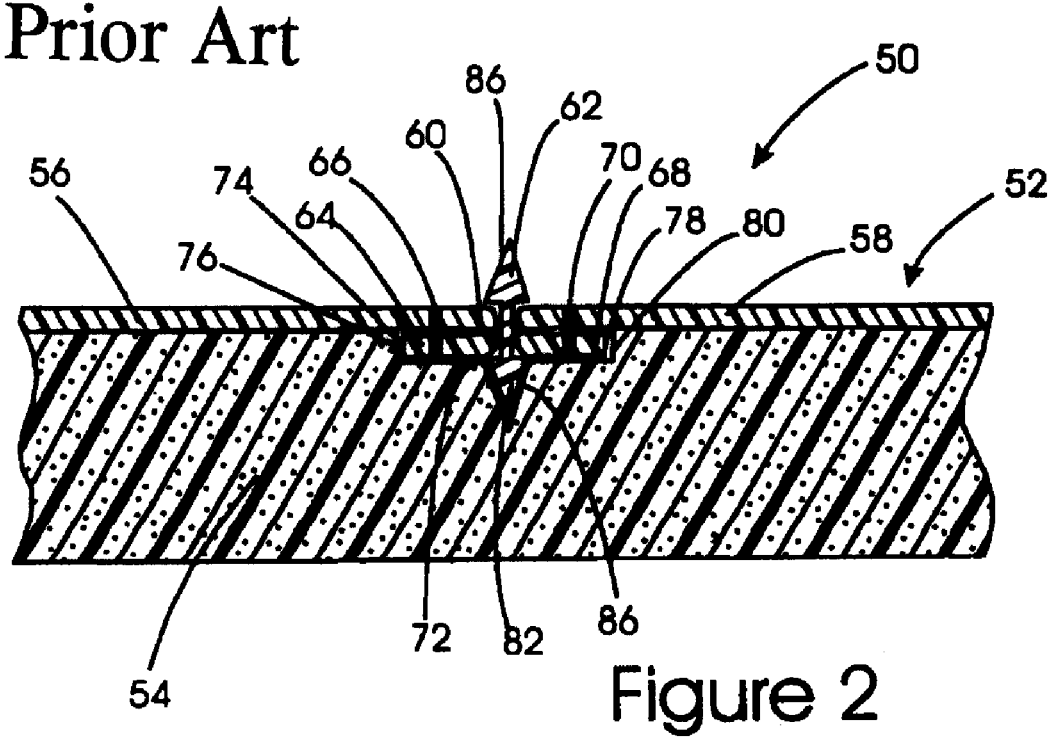
FIG. 2 is a cross-section of a prior art configuration in which a trim cover covers a substrate with improved positional tolerance achieved by a positioning strip.
Figure 3A:
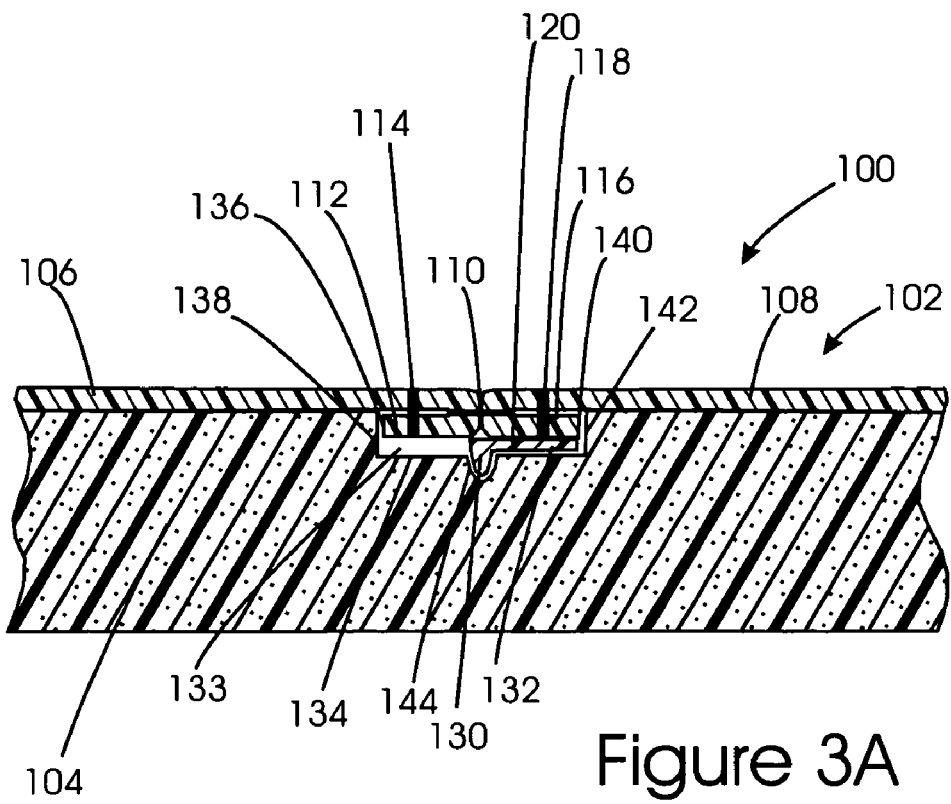
FIG. 3A is a cross-section of an embodiment of the present invention in which a welt is used to position a trim cover over a substrate.
Figure 3B:
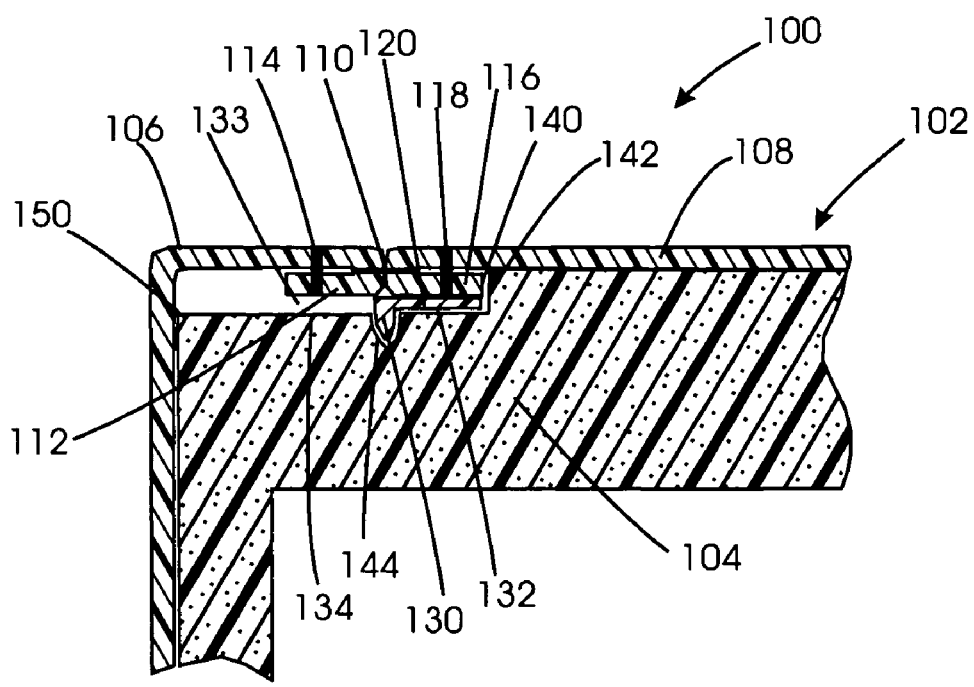
FIG. 3B is a cross-section of a variation of the present invention in which a welt is used to position a trim cover over a substrate.
Figure 4:
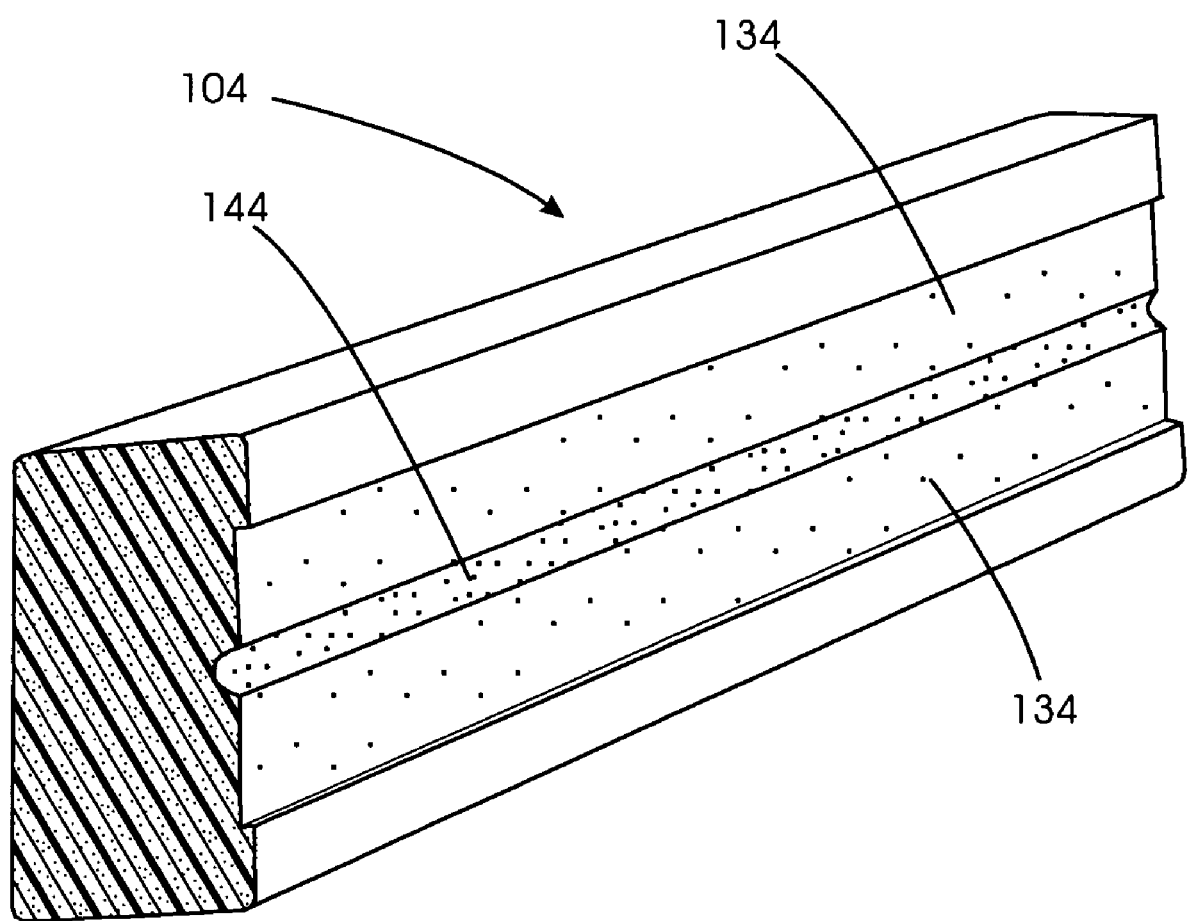
FIG. 4 is a perspective view of a substrate used in an embodiment of the present invention.

With reference to FIGS. 3A and 3B, cross-sections of a trim covered automobile interior components of an embodiment of the invention are provided. Automobile interior component 100 includes trim cover 102 covering substrate component 104. It should be appreciated that since FIGS. 3A and 3B are cross-sections, the illustrated constructions extends for some distance in a direction substantially perpendicular to the cross-sections. With reference to FIG. 4, a perspective view of an example of substrate 104 is provided. Substrate component 104 comprises any material that is suitable to be covered with a trim cover in automobile interior applications. Examples of such interior components include armrests, center consoles, dashboards, passenger seats, headliners, door panel inserts, quarter panel inserts, and sun visors. Typically, such substrates include one or more resins. In an important variation, the substrate includes a foam and in particular a foam resin. Trim cover 102 includes first trim pattern 106 which is attached to second trim pattern 108 with join seam 110. A trim pattern is the same as a trim cover section Trim patterns 106, 108 are made from any number of flexible materials. Examples include flexible resins, woven and nonwoven fabrics, leather, cloth, and the like. Flexible vinyl trim covers are particularly useful.

Still referring to FIGS. 3A, 3B, and 4, trim cover 102 optionally includes one or more additional seams located at proximate to join seam 110. Again, these additional seams may be decorative seams such as French seams. For example, selvage section 112 is sewn to first trim pattern 106 along first additional seam 114 and selvage section 116 is sewn to second trim pattern 108 along second additional seam 118. Moreover, welt strip 120 is attached to trim cover 102 by these one or more additional seams. For example, as shown in FIGS. 3A and 3B, welt strip 120 is along with selvage section 116 is sewn to second trim pattern 108 along second additional seam 118. In this example, selvage section 116 is interposed between second trim pattern 108 and welt strip 120. Welt strip 120 includes protrusion section 130 and a flat section 132. Welt strip 120 is formed from any material that is capable of forming protrusion section 130 attached to flat section 132. Suitable material for forming welt strip 120 include flexible resins. Vinyl and in particular extruded vinyl is particularly useful for constructing welt strip 120. Welt protrusion section 130 is centered with respect to join seam 110. Selvage sections 112, 116 along with join seam 110 in seam-mating section 133. In a variation, selvage sections 112, 116 and join seam 110 are positioned over step section 134 with edge 136 of selvage section 112 aligned with edge 138 of substrate 104 and edge 140 of selvage section 116 aligned with edge 142 of substrate component 104. Positioning of trim cover 102 is achieved by placement of at least of portion of protrusion section 130 into welt protrusion-mating channel 144 that is located in seam mating section 133. In a variation of the invention, trim cover 102 is adhered to substrate component 104. Such adhesion is accomplish either by an adhesive or by interposing an adhesive layer between trim component 102 and substrate component 104. FIG. 3B provides of a variation of this embodiment in which edge 136 is absent. In this variation, first trim pattern 106 is folded over edge 150 of substrate component 104.

Figure 5:
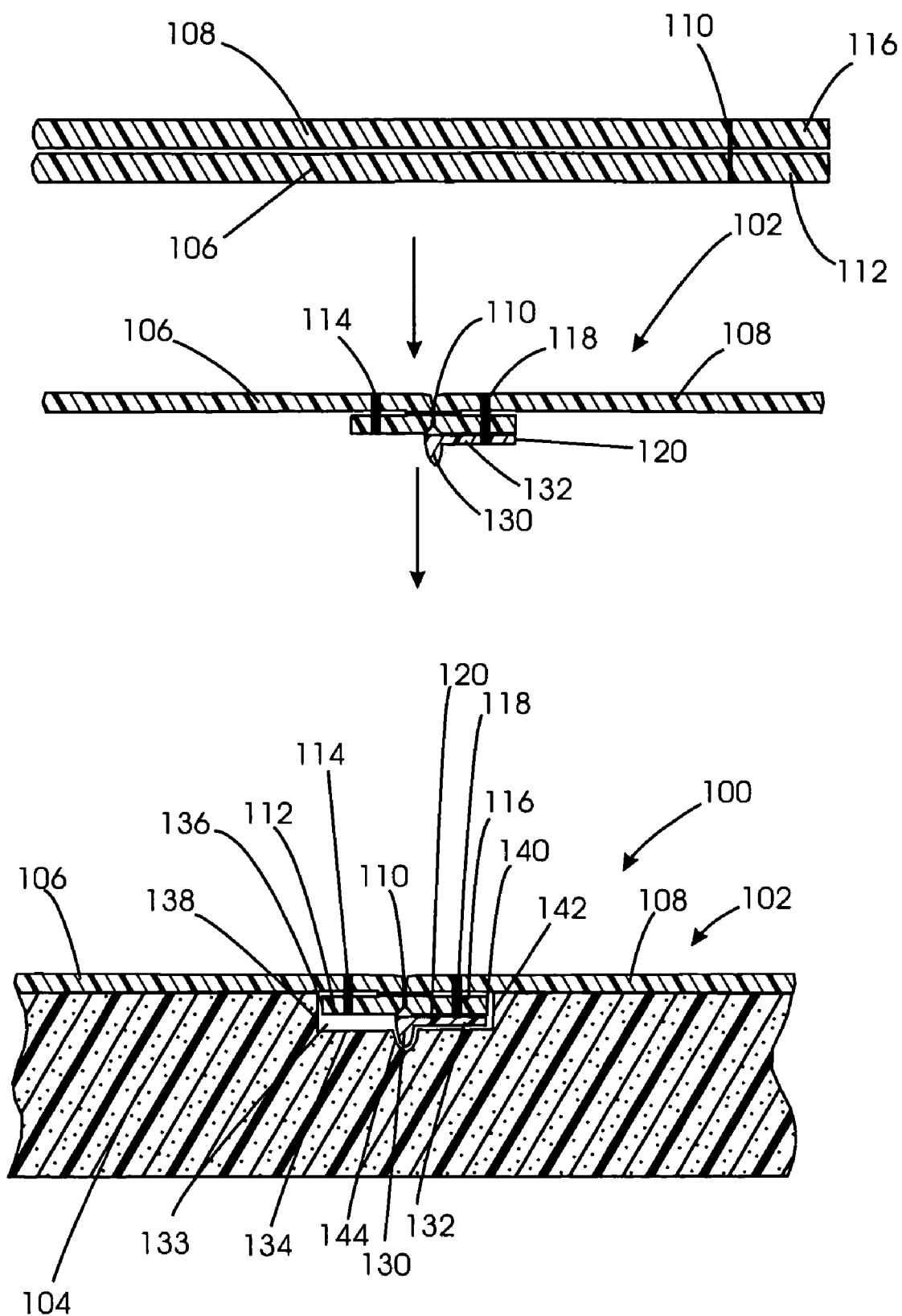
FIG. 5 is a schematic illustrating a method for forming the automobile interior component of the present invention.

With reference to FIG. 5, a flowchart demonstrating manufacture of the automobile interior components set forth above is provided. First trim pattern 106 and second trim pattern 108 are sewn together along join seam 110 to form trim cover 102. Next, welt strip 120 is attached to trim cover 102. In FIG. 4, selvage section 112 is sewn to first trim pattern 106 along first additional seam 114 and selvage section 116 and welt strip 120 is sewn to second trim pattern 108 along second additional seam 118. Trim cover 102 is attached to substrate component 104 such that welt protrusion section 120 is positioned in welt protrusion-mating channel 144. Optionally, trim cover 102 is adhered to substrate component 104 as set forth above.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An automobile interior component comprising:
    a substrate component having a seam-mating section, the seam-mating section having a seam mating step that includes a welt protrusion-mating channel such that the welt protrusion-mating channel is positioned within the step section;
    a trim cover having a first trim pattern and a second trim pattern joined by a join seam, a first selvage section, and a second selvage section, wherein the step section has an edge aligned with an edge of the first seam selvage section, a first additional seam and a second additional seam, the first additional seam attaching the first seam selvage section to the first trim pattern and the second additional seam attaching the second seam selvage section to the second trim pattern; and
    a welt strip having a flat section and a protrusion section, the protrusion being attached to the trim cover in the vicinity of the join seam and positioned in the welt protrusion-mating channel, wherein the welt strip is also attached to the first trim cover by the first additional seam.

2. The component of claim 1 wherein the substrate component comprises a resin.

3. The component of claim 1 wherein the substrate component comprises a foam.

4. The component of claim 1 wherein the welt protrusion is positioned over the join seam.

5. The component of claim 1 wherein the welt strip comprises a flexible resin.

6. The component of claim 5 wherein the welt strip comprises vinyl.

7. The component of claim 1 wherein the trim cover is adhered to the substrate component.

8. The component of claim 1 wherein automobile interior component is a component selected from the group consisting of armrests, center consoles, dashboards, passenger seats, headliners, door panel inserts, quarter panel inserts, and sun visors.

9. The component of claim 1 made by the method comprising:
    sewing the first trim pattern and the second trim pattern together to form the trim cover;
    attaching the welt strip to the trim cover such that the welt protrusion section is located adjacent to the join seam; and
    attaching the trim cover to the substrate component such that the welt protrusion section is positioned in the seam-mating section.

10. The component of claim 9 wherein the trim cover is adhered to the substrate component.

11. An automobile interior component comprising:
    a foam-containing substrate component having a seam-mating section positioned in a stepped section, the seam-mating section having a seam mating step that includes a welt protrusion-mating channel;
    a trim cover having a first trim pattern and a second trim pattern joined by a join seam, a first additional seam, and a second additional seam, wherein the step section has an edge aligned with an edge of a first seam selvage section, a first additional seam and a second additional seam, the first additional seam attaching the first seam selvage section to the first trim pattern and the second additional seam attaching a second seam selvage section to the second trim pattern; and a welt strip having a flat section and a protrusion section, the protrusion being attached to the trim cover in the vicinity of the join seam and positioned in the welt protrusion-mating channel wherein the welt strip is also attached to the first trim pattern by the first additional seam.

12. The component of claim 11 wherein automobile interior component is a component selected from the group consisting of armrests, center consoles, dashboards, passenger seats, headliners, door panel inserts, quarter panel inserts, and sun visors.

13. The component of claim 11 wherein the trim cover is adhered to the substrate component.

* * * * *